(12) United States Patent
Wyffels (10) Patent No.: US 10,891,744 B1
(45) Date of Patent: Jan. 12, 2021

(54) DETERMINING THE KINETIC STATE OF A BODY USING LIDAR POINT CLOUD REGISTRATION WITH IMPORTANCE SAMPLING

(71) Applicant: Argo AI, LLC, Pittsburgh, PA (US)

(72) Inventor: Kevin Lee Wyffels, Livonia, MI (US)

(73) Assignee: Argo AI, LLC, Pittsburgh, PA (US)

( * ) Notice: Subject to any disclaimer, the term of this patent is extended or adjusted under 35 U.S.C. 154(b) by 140 days.

(21) Appl. No.: 16/352,172

(22) Filed: Mar. 13, 2019

(51) Int. Cl.
*G06T 7/35* (2017.01)
*G01S 17/89* (2020.01)
*G06T 7/32* (2017.01)
*G06K 9/00* (2006.01)

(52) U.S. Cl.
CPC ............... *G06T 7/35* (2017.01); *G01S 17/89* (2013.01); *G06K 9/00201* (2013.01); *G06T 7/32* (2017.01); *G06T 2207/10028* (2013.01)

(58) Field of Classification Search
CPC ........... G06K 9/00201; G06K 9/00208; G06K 9/00718; G06K 9/6232; G06K 9/6257; G06K 9/6277
See application file for complete search history.

(56) References Cited

U.S. PATENT DOCUMENTS

| | | | |
|---|---|---|---|
| 9,430,822 B2 | 8/2016 | Irschara et al. | |
| 9,524,582 B2 | 12/2016 | Ma et al. | |
| 10,018,726 B2 | 7/2018 | Hall et al. | |
| 2009/0232355 A1 | 9/2009 | Minear et al. | |
| 2017/0161945 A1 | 6/2017 | Robert et al. | |
| 2018/0203446 A1* | 7/2018 | Wyffels | B60W 30/09 |
| 2018/0237000 A1 | 8/2018 | Litkouhi et al. | |
| 2019/0147220 A1* | 5/2019 | McCormac | G06K 9/00201 382/103 |

FOREIGN PATENT DOCUMENTS

GB 2559157 A 8/2018

OTHER PUBLICATIONS

Eckart, B., "Compact Generative Models of Point Cloud Data for 3D Perception", thesis submitted to The Robotics Institute, Carnegie Mellon University, Oct. 2017.
Sandhu R. et al., "Particle Filtering for Registration of 2D and 3D Point Sets with Stochastic Dynamics", IEEE Computer Society Conference on Computer Vision and Pattern Recognition, Jul. 2008.

* cited by examiner

*Primary Examiner* — Manuchehr Rahmjoo
(74) *Attorney, Agent, or Firm* — Fox Rothschild LLP (57) ABSTRACT

A method of estimating a kinetic state of a rigid body is disclosed. A LiDAR sensor receives multiple point clouds. A processor determined a rigid body transform for a pair of the received point clouds and obtains a sample space of previous rigid body transforms. The processor then identifies a proposal distribution that represents the probability that any rigid body transform in the sample space best aligns a subset of points of a first point cloud of the pair to a subset of points in a second point cloud of the pair. The processor then uses importance sampling to identify a probability distribution for the rigid body transform that best aligns the subsets of points, It then uses the identified probability distribution and a history of probability distributions to estimate a kinetic state of the rigid body.

18 Claims, 5 Drawing Sheets

DETERMINING THE KINETIC STATE OF A BODY USING LIDAR POINT CLOUD REGISTRATION WITH IMPORTANCE SAMPLING

BACKGROUND

Light detecting and ranging (LiDAR) systems are used in various applications, such as autonomous vehicles, drones and other robotic systems. In various applications, the LiDAR systems can be used to scan an area and use the scan for three-dimensional (3D) reconstruction or object recognition. Each scan of a LiDAR system produces a point cloud, which is a set of data points in space.

To determine the position or kinetic state of an object, point cloud registration can be used. The goal of point cloud registration is to solve for the rigid body transform that best aligns two different point clouds. Two point clouds returned from an object at different times (such as successive 3D LiDAR scans) can be compared to serve as a stable measurement of a change in the object's pose over the time duration bounded by the scans.

Point cloud registration is well-known and commonly used with LiDAR systems. However, there are several issues with existing point cloud registration methods. One issue is that since the point cloud registration is between two point clouds, a significant overlap between the two point clouds is needed for registration. This overlap gives certainty that the rigid body transform is the one that best aligns the two point clouds. A second issue is that point cloud registration does not provide a direct measure of uncertainty in the result. Since the point cloud registration solves for the rigid body transform that best aligns the two point clouds, there is a chance that the rigid body transform is not the best.

This document describes a method and system for probabilistic point cloud registration via importance sampling directed to solving the issues described above, and/or other issues.

SUMMARY

In various embodiments, a system will estimate a kinetic state of a rigid body. To do this, a LiDAR sensor will receive a first point cloud and a second point cloud. The first point cloud and second point cloud each include a subset of points, and each point in each subset of points comprises data returned to the LiDAR sensor from a rigid body. A processor will determine a rigid body transform for the first point cloud and the second point cloud. The processor will obtain a sample space of rigid body transforms, wherein a previous point cloud registration identified each rigid body transform of the sample space of rigid body transforms. The processor will identify a proposal distribution, wherein the proposal distribution comprises probabilities that each rigid body transform in the sample space is the rigid body transform that best aligns the subset of points of the first point cloud to the subset of points in the second point cloud. The processor will perform importance sampling on the proposal distribution identify a probability distribution for the rigid body transform that best aligns the subset of points of the first point cloud to the subset of points in the second point cloud. The processor will use the identified probability distribution and a history of previously-identified probability distributions to estimate a kinetic state of the rigid body.

Optionally, the processor may identify a sample size for the sample space, calculate an effective sample size between the proposal distribution and the probability distribution, and compare the effective sample size to the identified sample size to determine the potential proposal distribution is similar to the probability distribution. If the proposal distribution is not similar to the probability distribution, the processor may obtain an updated sample space using an increased sample size, identify an updated proposal distribution for the updated sample space, perform importance sampling on the updated proposal distribution to identify an updated probability distribution, and use the updated probability distribution and the history of previously-identified probability distributions to re-estimate the kinetic state of the rigid body.

Optionally, when identifying the proposal distribution, the processor may use a uniform distribution. Alternatively, when identifying the proposal distribution the processor may use a prior probability distribution.

Optionally, performing importance sampling on the proposal distribution to solve for the probability distribution may include modeling the probability distribution as a Gaussian distribution parameterized by the mean and covariance, and using importance sampling on the proposal distribution to approximate the mean and covariance of the probability distribution.

Optionally, identifying the proposal distribution may comprise determining a kernel function that reflects an affinity between a point of the rigid body in the subset of points in the second point cloud and a point of the rigid body in the subset of points in the first point cloud via the rigid body transform, and using the kernel function to determine potentially optimal rigid body transforms. Optionally, the affinity may include one or more of the following: point density, point color, point surface intensity, or point surface normal.

Optionally, obtaining the sample space of rigid body transforms may include using a lookup table for all combinations of a prior point cloud and corresponding rigid body transforms.

Optionally, the method may include separately specifying a naturally encoded uncertainty of the probability distribution that corresponds to an optimal rigid body transform. The method also may include using the history of probability distributions to estimate the kinetic state of the rigid body comprises using the history of probability distributions as a measurement of object pose in a Kalman Filter to estimate position, velocity, and acceleration of the rigid body over time.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

The present disclosure generally relates to a system and method for performing point cloud registration on data collected by a LiDAR system over time. References to various embodiments and examples set forth in this specification do not limit the scope of the disclosure and merely set forth some of the many possible embodiments of the appended claims.

Figure 1:
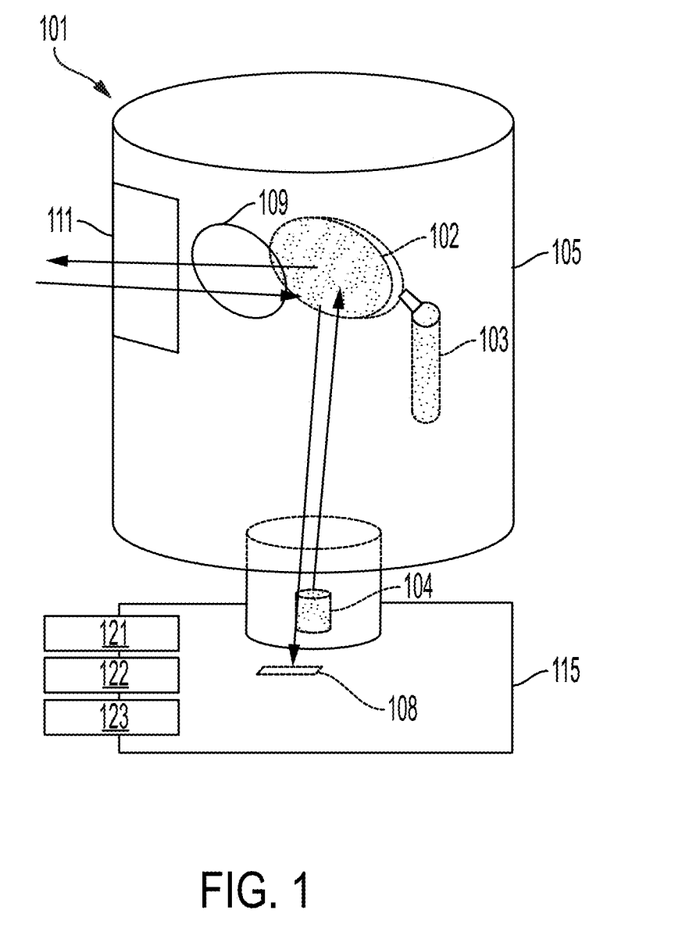
FIG. 1 illustrates example components of a LiDAR system, such as may be used with an autonomous vehicle.

FIG. 1 shows an example LiDAR system 101 as may be used in various embodiments. As shown in FIG. 1, the LiDAR system includes a laser scanner housing 105 with a laser emitter/receiver shell portion 111 arranged around the perimeter of the housing. The shell portion 111 will be made of a material that is transparent to infrared light, so that the system may emit infrared light through the shell portion 111 and receive infrared light that is reflected back toward the shell portion. While the example of FIG. 1 only shows a segment of the shell portion 111, in practice the shell portion will encircle the entire circumference of the housing 105.

The LiDAR system 101 will include a laser emitter system 104 that is positioned and configured to generate and emit pulses of infrared light out of the shell portion 111 via one or more laser emitter chips or other laser emitting devices. The laser emitter system 104 may include any number of individual laser emitters, including for example 8 emitters, 64 emitters or 128 emitters.

The LiDAR system will also include a light detector 108 containing a photodetector or array of photodetectors positioned and configured to receive light reflected back into the system. As shown below, both the laser emitter system 104 and the light detector unit 108 may be positioned at angles from the front side of a mirror 102 The mirror 102 is connected to a motor 103 that can rotate the mirror 360° so that the system may emit and receive light through the entire circumference of the shell portion 111. As shown, the light emitted by the laser emitter system 104 reflects off of the front of the mirror 102 before exiting the shell portion 111, and light received into the shell portion also reflects off of the front of the mirror 102 toward the light detector unit 108. However, in alternate embodiments, the mirror 102 may include a slot, the laser emitter system 104 may be located behind the mirror 102 at a position from which it will direct laser light through the slot, and the motor 103 may rotate the laser emitter system 104 and the mirror 102 as a single unit. Optionally, the light detector unit 108 also may be connected to a rotating structure of which the mirror 102 and laser emitter system 104 are a part so that it too rotates with the rotating light emitting/receiving structure.

One or more optical element structures 109 may be positioned in front of the mirror 102 to focus and direct light that is passed through the optical element structure 109. As shown below, the system includes an optical element structure 109 positioned in front of the mirror 102 and connected to the rotating elements of the system so that the optical element structure 109 rotates with the mirror 102. Alternatively or in addition, the optical element structure 109 may include multiple such structures (for example lenses and/or waveplates). Optionally, multiple optical element structures 109 may be arranged in an array on or integral with the shell portion 111.

The LiDAR system will include a power unit 121 to power the laser emitter unit 104, a motor 103, and electronic components. The LiDAR system will also include an analyzer 115 with elements such as a processor 122 and non-transitory computer-readable memory 123 containing programming instructions that are configured to enable the system to receive data collected by the light detector unit, analyze it to measure characteristics of the light received, and generate information that a connected system can use to make decisions about operating in an environment from which the data was collected. Optionally, the analyzer 115 may be integral with the LiDAR system 101 as shown, or some or all of it may be external to the LiDAR system and communicatively connected.

In the embodiments described below, a LiDAR system such as that described in FIG. 1 will deliver point cloud data to a processor and a data store. Referring to the flow diagram of FIG. 2, the LiDAR system will capture point cloud data (step 201) as the autonomous vehicle or other device to which the LiDAR system is attached moves about an environment. The data store will store a collection of point clouds captured by the LiDAR system over a period of time. Optionally, the data store may only store point clouds for a limited period of time, and it will delete them when the time expires. Alternatively, the data store may only store a limited number of point clouds at any point in time, and when that limited number is reached it may delete the oldest cloud when a new cloud is received and saved. In addition or alternatively, the system may store point clouds until completion of a session (such as a vehicle trip), and it may delete those point clouds when a new session is begun.

Figure 2:
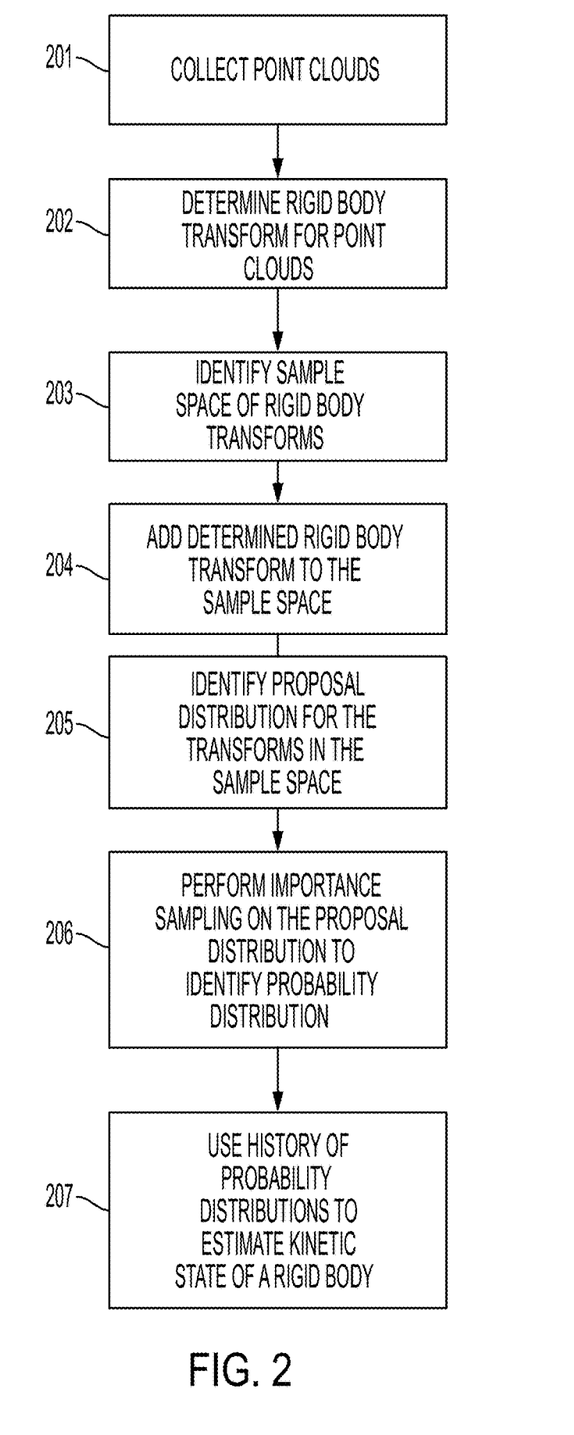
FIG. 2 is a flow diagram illustrating example steps in a process that uses point cloud registration to estimate the kinetic state of a rigid body.

Each point cloud received by the LiDAR sensor contains a subset of points. Each point in the subset of points represents data capture by the LiDAR sensor based on light reflected from a rigid body. Therefore, when comparing two different point clouds, the system will use a rigid body transform. A rigid body transform (which is sometimes referred to in the art as a rigid transformation, a Euclidean transformation or Euclidean isometry) is a geometric transformation of a Euclidean space that preserves the Euclidean distance between every pair of points. A rigid transformation may include rotation, translations, reflections, or their combination. The system will include programming instructions that are configured to cause the processor to identify an optimal rigid body transform for a comparison of two point clouds in a probabilistic manner.

To do this, in various embodiments, after the LiDAR system receives two point clouds or the processor retrieves two stored point clouds from the data store, the processor may obtain a sample space of rigid body transforms, either by defining it through analysis of possible rigid body transforms or by obtaining it from a memory (step 202). The sample space will be a continuous space of all (or substantially all) feasible rigid body transforms, where "feasible" means that the rigid body transform results in at least some overlap between the two point clouds. (In other words, if there is no overlap, then the rigid body transform is not feasible.)

In various embodiments, prior to performing point cloud registration, the processor may generate a new rigid body transform for the sample set by using the two received point clouds (step 202). For example, the processor may use a given rigid body transform to compare a point in one of the point clouds to all of the points in the second point cloud. Upon determining that the rigid body transform results in the point in one point cloud matching a point in the second point cloud, the system may add that rigid body transform to the sample set of rigid body transforms (step 203). This computation may be performed for a given set of rigid body transforms to determine a set that serves as a sample space of rigid body transforms. Alternatively, this computation may be replaced by the processor being configured to use a lookup table for all combinations of a prior point cloud and corresponding rigid body transforms. For example, each point cloud will be associated with multiple rigid body transforms. The processor may compare one of the two, or both, point clouds to a prior point cloud to determine that they are similar Once one of the two point clouds are determined to be similar to the prior point cloud, the rigid body transforms associated with the prior point cloud are used as the sample space of rigid body transforms.

Once the system identifies the sample space, it will then execute programming instructions that cause the processor to identify a proposal distribution (step 205) for the rigid body transforms in the sample space. The proposal distribution is a best guess for the rigid body transform that best aligns the two point clouds. In other words, the proposal distribution represents the probability that any particular rigid body transform is the optimal rigid body transform that best aligns the subset of points of the first point cloud to the subset of points in the second point cloud. In some embodiments, the proposal distribution may be a previous probability distribution for a rigid body transform. For these embodiments, the proposal distribution may be for a rigid body transform that is determined by the processor to be similar to a potentially optimal rigid body transform.

In comparison to the proposal distribution (which is an estimate of a distribution that aligns two point clouds), a probability distribution is the rigid body transform that actually best aligns the subset of points of the first point cloud to the subset of points in the second point cloud. In some embodiments, the probability distribution may be a continuous probability distribution. Some examples of continuous probability distributions are normal (also referred to as Gaussian), uniform, and chi-squared distributions.

The processor may apply importance sampling to the proposal distribution (step 206), and by doing so the processor will solve for a probability distribution to determine the rigid body transform best aligns the two point clouds. In this way, the more similar the proposal distribution is to the probability distribution, the higher the probability that a rigid body transform is the transform that best aligns the two point clouds, and the rigid body transform with the highest probability may be considered to be the optimal rigid body transform. In this way, solving for the probability distribution using importance sampling on the proposal distribution (i.e., previous probability distribution), gives an approximation of a movement of the rigid body based on the rigid body transform determined to be similar to the optimal rigid body transform.

In some embodiments, the processor may be programmed to store each solved probability distribution to the memory device. The processor may use the determined probability distribution, along with a history of these stored probability distributions, to estimate a kinetic state of a rigid body (step 207). For example, since each probability distribution represents the probability that a corresponding rigid body transform is the rigid body transform that best aligns two point clouds, multiple rigid body transforms applicable to one rigid body can be used to estimate the movements of that rigid body, which allows estimation of the kinetic state of that rigid body. This estimation includes an uncertainty since it is dependent on a probability. In some embodiments, the processor is configured to separately identify the naturally encoded uncertainty of the probability distribution that corresponds to the optimal rigid body transform so that the user of the system can associate each probability distribution to an uncertainty.

Examples and additional details for each of these steps follow in the discussion below.

Obtaining the Sample Space of Rigid Body Transforms (Step 203):

In some embodiments, the programming instructions may be instructed to cause the processor to obtain the sample space of rigid body transforms. This process may start with the processor selecting a sample size. This sample size may be a default sample size, such as 100. Later, in the context of the importance sampling step (discussed below), the system may determine an effective sample size and use the effective sample size to assess whether the default sample size is too large or too small using an equation such as:

$$L_{eff} = \frac{\left(\sum_{\ell=1}^{L} \omega_\ell\right)^2}{\sum_{\ell=1}^{L} \omega_\ell^2} = \frac{1}{\sum_{\ell=1}^{L} \omega_\ell^2} \qquad \text{(equation 1)}$$

in which each $\omega$ represents an importance weight (which will be described below in the discussion of importance sampling).

The effective sample size is then compared to the default sample size. If the effective sample size is similar to the default sample size, this indicates that the proposal distribution is similar to the probability distribution, otherwise they are not similar and the default sample size needs to be increased. After increasing the default sample size, the processor may be configured to perform the process again until the effective sample size is similar to the default sample size.

Choosing a Proposal Distribution (Step 205):

As noted above in the discussion of step 205, in some embodiments the system may select a previous probability distribution for a rigid body transform to be the proposal distribution $q(T_k)$. Alternatively, the system may choose a distribution such as: (i) the Gaussian prior over the pose of the object being tracked, as estimated by an extended Kalman filter, or (ii) a uniform distribution over a reachable set of poses.

Other sampling strategies could be used such as Markov Chain Monte Carlo sampling methods. Another sampling strategy may provide the processor with programming instructions to use a kernel function. A kernel function is a function that is used to measure the affinity (or similarity) between two objects. The affinity can be a variety of features, some being point density, point color, point surface intensity, point surface normal, etc. Examples of some commonly used kernel functions are uniform, triangle, tricube, triweight, Gaussian, quadratic, and cosine. The kernel function is used to compare a point of the rigid body in the subset of points in one point cloud to the point of the rigid body in the subset of points of the second point cloud for a given rigid body transform. Therefore, for each rigid body transform of the sample set, the kernel function may be used to determine the rigid body transform that results in the highest similarity between the two point clouds, which is a potentially optimal rigid body transform.

Solving for a Probability Distribution Via Importance Sampling (Step 206):

Importance sampling is a process that numerically approximates the moments of a variable, Y~p(Y), in the event that p(Y) can be evaluated but not sampled from directly. The method proceeds by drawing samples, $Y_\ell \in \forall \in \{1, \ldots, L\}$, from a proposal distribution q(Y) that is chosen to be similar to p(Y) except that it is from a family of distributions that can be sampled from directly. Then the moments of Y can be approximated from these samples as follows (only the first two moments are shown here, but the method extends to higher moments):

$$E[Y] \approx \sum_{\ell=1}^{L} \omega_\ell Y_\ell \qquad \text{(equation 2)}$$

$$E[(Y - E[Y])(Y - E[Y])^T] \approx \sum_{\ell=1}^{L} \omega_\ell [(Y_\ell - E[Y])(Y_\ell - E[Y])^T]$$

where $\omega_\ell$ are the importance weights defined as:

$$\omega_\ell = \frac{p(Y_\ell)/q(Y_\ell)}{\sum_{\iota=1}^{L} p(Y_\iota)/q(Y_\iota)} \qquad \text{(equation 3)}$$

As long as q(Y)>0 everywhere that p(Y)>0, the moment estimates will converge to the true moments as L→∞. The closer q(Y) is to p(Y), the more meaningful each sample becomes, and fewer samples may be required to achieve good approximations of the true moments.

Returning to the present embodiments, to account for the many sources of uncertainty in the problem of point cloud registration, the embodiments described in this document solve for a continuous probability distribution over the registration result, rather than simply solving for a single result. This document may refer to such a continuous probability distribution as a "true distribution." A true distribution can be written as:

$$p(T_{k, k-1}|Z_{k-1}, Z_k) \qquad \text{(equation 4)}$$

where $T_{k, k-1}$ denotes the rigid body transform between the object pose at times k−1 and k, and $Z_k$ denotes the point cloud returned from the object at time k. In this way, the method described in this document lends itself to probabilistic inference/filtering techniques aimed at estimating the kinematic state (e.g. position, velocity, and acceleration) of dynamic extended objects over time from a history of uncertain observations, which may be used in step 206 as described below.

As described above, in some embodiments, importance sampling can be performed on the proposal distribution to solve for the probability distribution. To do this, the programming instructions may be configured to cause the processor model the probability distribution as a Gaussian distribution parameterized by a mean and covariance. A significance of the Gaussian distribution is that it is a distribution whose statistical moments beyond the first two (i.e. mean and covariance) are zero. Thus, the continuous probability distribution over the registration result (the true distribution) can also be illustrated as:

$$p(T_{k, k-1}|Z_{k-1}, Z_k) = N(T_{k, k-1}, R_k) \qquad \text{(equation 5)}$$

Performing importance sampling on the proposal distribution allows the processor to approximate the mean ($T_{k, k-1}$) and covariance ($R_k$) of the probability distribution. For example, a sample may be drawn from the proposal distribution, and the drawn sample may then be scored based on some objective function. This will be repeated multiple times, and then the processor will compute the weighted sample mean and covariance of the drawn samples, where the weights are related to the scores. The weighted sample mean and covariance is similar to the mean and covariance of the probability distribution, and the weighted sample mean and covariance therefore will be used as the solution for the probability distribution. In this way, the mean and covariance of the proposal distribution is matched to the mean and covariance of the probability distribution.

To evaluate the true distribution at a given sample of $T_{k,k-1}$, the system may leverage Bayes' rule as follows:

$$p(T_{k,k-1}|Z_{k-1}, Z_k) = \frac{p(Z_k|T_{k,k-1}, Z_{k-1})p(T_{k,k-1}|Z_{k-1})}{p(Z_k, Z_{k-1})} \qquad \text{(equation 6)}$$

where $p(T_{k, k-1}|Z_{k-1}, Z_k)$ can generally be assumed to be uniform (i.e. knowledge of only the point cloud at time k−1 does not provide any information about the future object motion), and p(Zk, Zk−1) serves as a normalization constant. Therefore, equation (6) simplifies to:

$$p(T_{k, k-1}|Z_{k-1}, Z_k) \propto ((Z_k|T_{k, k-1}, Z_{k-1}) \qquad \text{(equation 7)}$$

For applications in which the point clouds $Z_{k-1}$ and $Z_k$ represent sensor returns from opaque object surfaces, the term on the right of equation (7) can be interpreted as a nonparametric probabilistic model of the previously observed object surfaces, and modeled via kernel density estimation methods. Specifically, the system may model the likelihood that a single point $Z_k$ is observed from an object that previously returned the point cloud $Z_{k-1}$, and has since moved according to $T_{k, k-1}$ as:

$$p(z_k|T_{k,k-1}, Z_{k-1}) = \frac{1}{|Z_{k-1}|} \sum_{\iota=1}^{|Z_{k-1}|} g(z_k - T_{k,k-1} z_{k-1}^\iota) \qquad \text{(equation 8)}$$

where g (•) is a kernel function chosen/designed to reflect the affinity between $z_k$ and the ιth point in $Z_{k-1}$ projected forward to time k via $T_{k, k-1}$. Notice that equation (7) does not enforce a one-to-one correspondence of $z_k$ to a point in $Z_{k-1}$, which is a drawback of some existing registration methods when applied to the class of registration problems of interest in the methods disclosed in this document. Here, when $Z_k$ is collected independently of $Z_{k-1}$ under changing viewpoint and environmental conditions, such that a true one-to-one correspondence among points in the two clouds does not exist. Further, note that the kernel function, g (•), in equation (5) may be designed to include other features of the points, such as color, intensity, surface normal, etc.

The model in equation (8) may be extended to the full likelihood in equation (7) by considering the joint density over all points in $Z_k$, assuming they are mutually independent:

$$p(Z_k|T_{k,k-1}, Z_{k-1}) = \prod_{j=1}^{|Z_k|} p\left(z_k^j \middle| z_k^{1:j-1}, T_{k,k-1}, Z_{k-1}\right) \qquad \text{(equation 9)}$$

$$= \prod_{j=1}^{|Z_k|} p(z_k^j | T_{k,k-1}, Z_{k-1})$$

This approach can be adapted to use the entire history, or window of length n−1, point clouds assigned to the object as the probabilistic surface model by replacing all instances of $Z_{k-1}$ in the derivation above with $Z_{k,\ k-1}$ or $Z_{k-n,\ k-1}$, respectively.

Alternatively, in some embodiments, instead of using the model of equation (7) the system may refer to a lookup table stored in a memory, wherein the table includes all combinations of $Z_{k-1}$ points and $T_{k,\ k-1}$ samples.

Estimating the Kinetic State of the Rigid Body.

In some embodiments, the processor is configured to use the history of probability distributions as a measurement of object pose to estimate position, velocity, and acceleration of the rigid body. Techniques that may be used to estimate position, velocity, and acceleration of the rigid body include, but are not limited to, a Kalman filter. A Kalman filter such as an extended Kalman filter or an unscented Kalman filter is a known algorithm that uses a series of measurements to produce estimates of unknown variables. Therefore the Kalman filter can be used with the history of probability distributions to produce estimates for the position, velocity, and acceleration of the rigid body.

Methods for estimating a kinetic state of a rigid body using the above-disclosed embodiments of the system are provided. In some embodiments, the method includes a LiDAR sensor receiving a first point cloud and a second point cloud. A processor obtains a sample set of rigid body transforms and uses that sample set to identifying an optimal rigid body transform. The processor also identifies a proposal distribution and a probability distribution for the rigid body transform. The probability distribution is for the rigid body transform that best aligns the subset of points of the first point cloud to the subset of points in the second point cloud. The processor then performs importance sampling on the proposal distribution to solve for the probability distribution, and uses a history of probability distributions to estimate a kinetic state of the rigid body.

EXAMPLES

Figure 3:
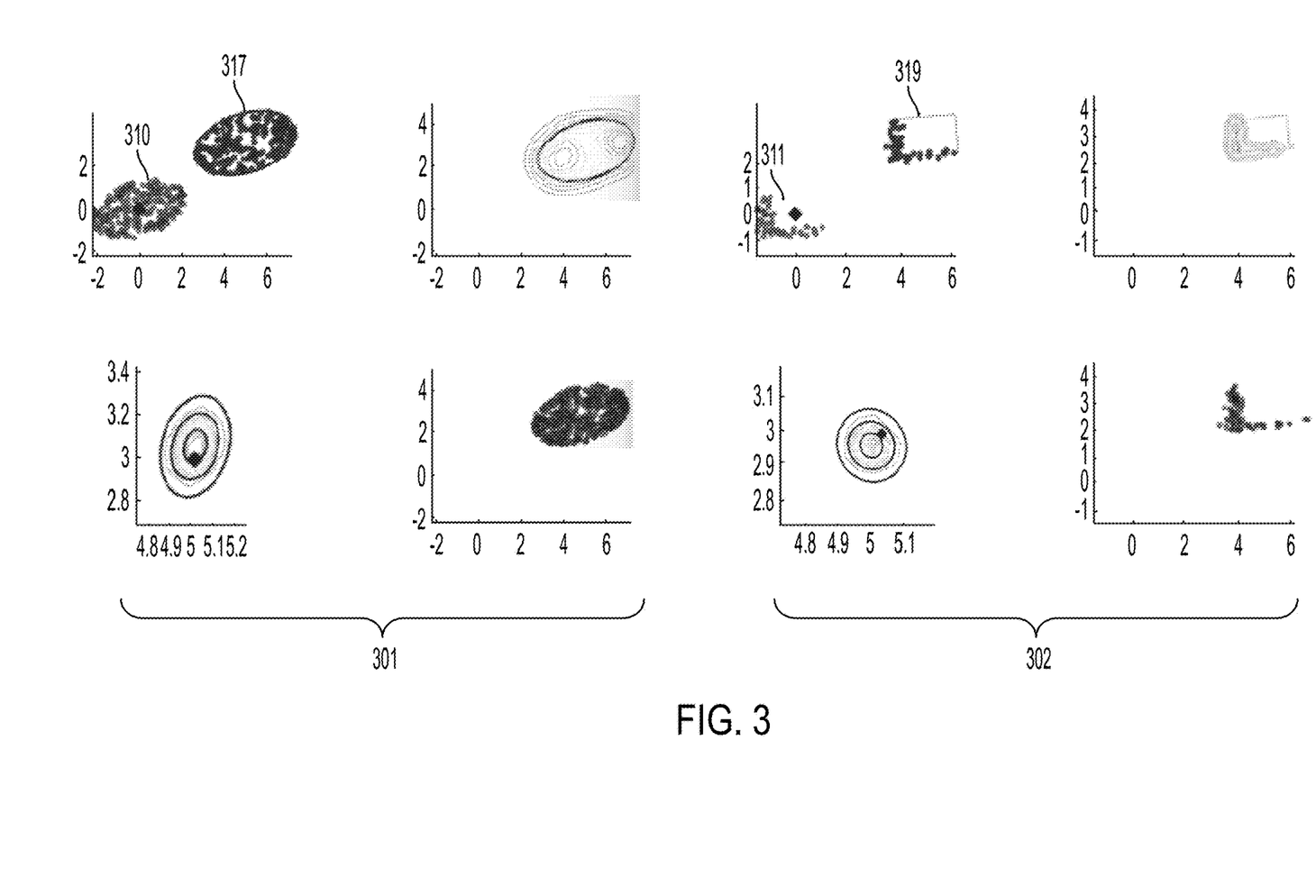
FIGS. 3 and 4 illustrate an example application of the processes described in this document to two two-dimensional objects.
Figure 4:
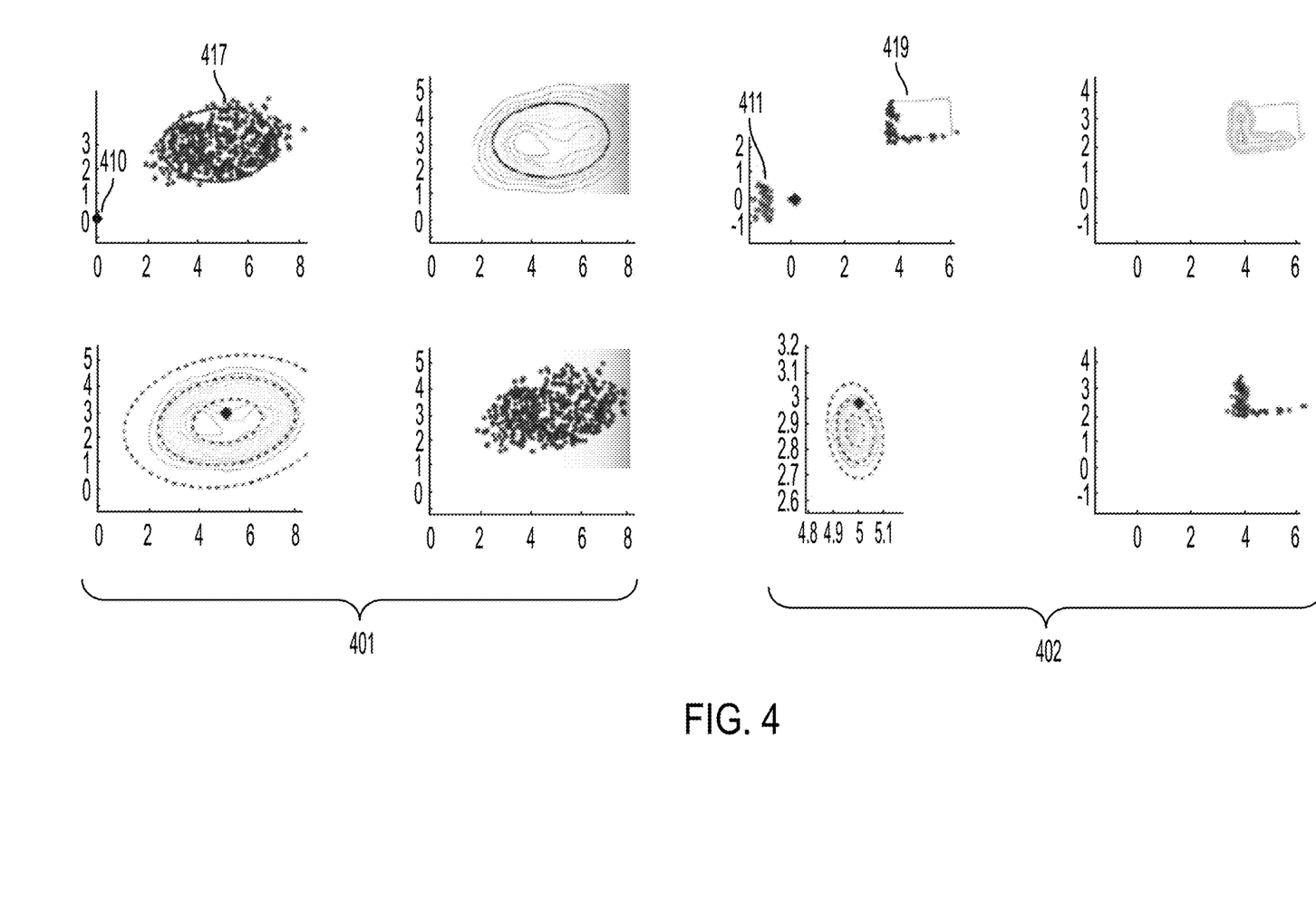

FIGS. 3 and 4 demonstrate an example application of the probabilistic registration approach described above to a two-dimensional object with two different object types. In FIGS. 3 and 4, the left sets of four subplots 301, 401 demonstrate an elliptical object with LiDAR reflection points randomly sampled from the interior of the object extent, and the right sets of four subplots 302, 402 demonstrates a rectangular object with LiDAR reflection points randomly sampled from the visible edges of the object extent. Within each object-specific set of subplots: (i) the top left image illustrates a previous point cloud 310, 311, 410, 411 and current point cloud 317, 319, 417, 419; (ii) the top right image contours of the probabilistic surface model described above using a Gaussian kernel; (iii) the bottom left illustrates contours of equation (7) above with Gaussian approximation overlaid (1-, 2-, and 3-σ ellipses); and (iv) the bottom right image illustrates maximum likelihood alignment, i.e. the alignment provided by the $T_{k,\ k-1}$ that maximizes the result of equation (7).

FIG. 4 demonstrates the ability of the probabilistic registration approach described above to handle occlusion in an intuitive way without requiring explicit occlusion reasoning. Specifically, the ellipse example 401 shows the extreme case where the previous point cloud, $Z_{k-1}$, is a single point due to poor visibility, and the current observation represents full visibility of the object, thereby resulting in the worst case disparity in visibility between successive observations. In the absence of contextual information (e.g. explicit occlusion reasoning), there is complete uncertainty about which portion of the object was observed in $Z_{k-1}$, due to the lack of geometric features represented in $Z_{k-1}$. With the proposed probabilistic registration approach, this uncertainty correctly maps to uncertainty in the registration result (proportional to the size of the object) as can be seen by comparing the bottom left subplot of the ellipse example 401 of FIG. 2 to that 301 of FIG. 1 (notice the difference in scale). Note that a human could not align these point clouds with a higher degree of confidence given the available information. Conversely, the rectangle example 402 shows the common case where a viewpoint change reveals a new surface of the object. In this case the geometric features present in $Z_{k-1}$ (i.e. a line) inherently enables a high confidence alignment of the point clouds despite the discontinuity in surface visibility.

Terminology that is relevant to this disclosure includes;

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Figure 5:
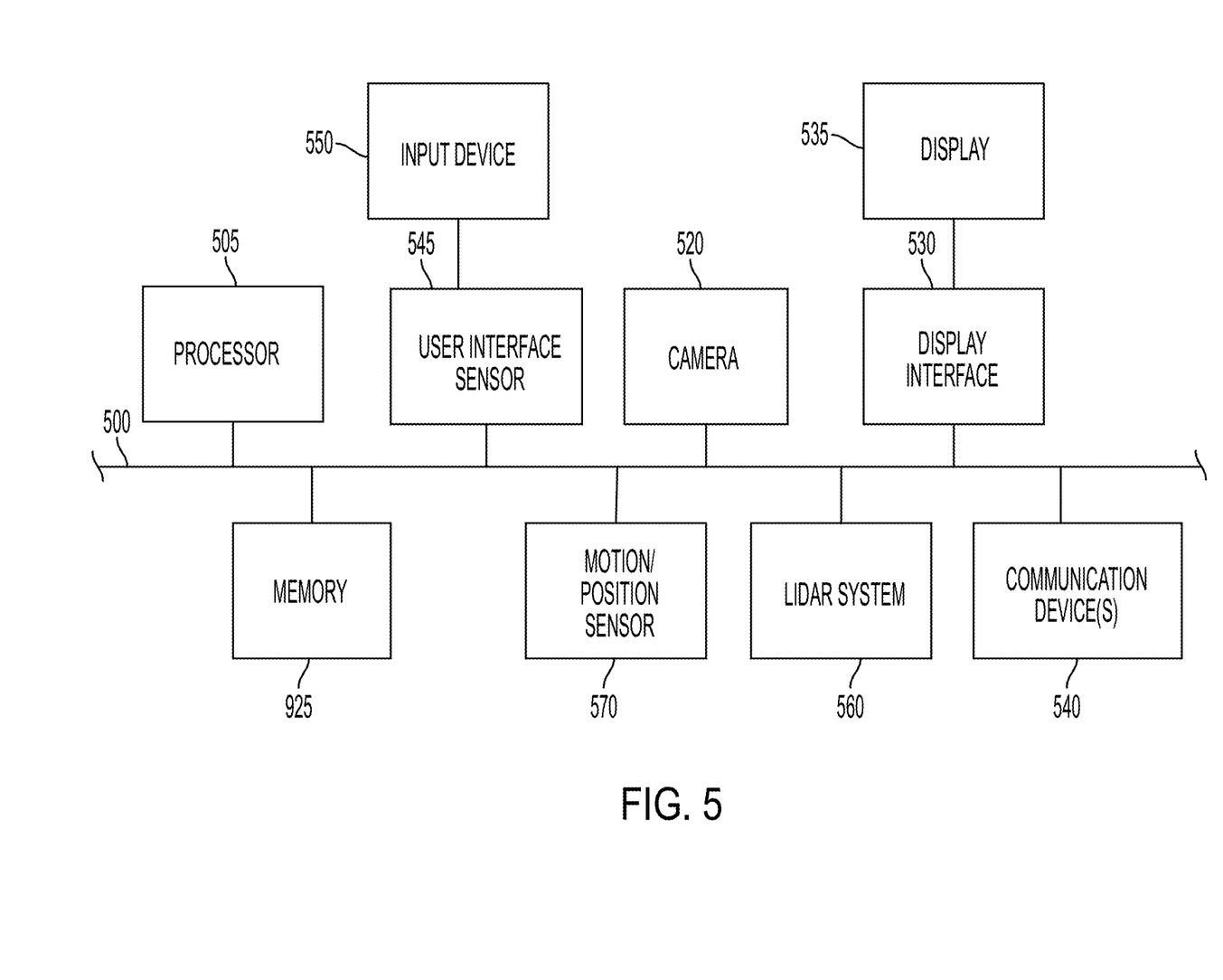
FIG. 5 is a block diagram of elements of a computing device on which the various systems and methods in this document could be implemented.

FIG. 5 depicts an example of internal hardware that may be included in any of the electronic components of the system, such as internal processing systems, external monitoring and reporting systems, or remote servers. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from a camera 520 that can capture video and/or still images. The system also may receive data from a motion and/or position sensor 570 such as an accelerometer, gyroscope or inertial measurement unit. The system also may receive data from a LiDAR system 560 such as that described earlier in this document.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of estimating a kinetic state of a rigid body, the method comprising:
   by a LiDAR sensor, receiving a first point cloud and a second point cloud, wherein the first point cloud and second point cloud each comprise a subset of points, and wherein each point in each subset of points comprises data returned to the LiDAR sensor from a rigid body;
   by a processor:
      determining a rigid body transform for the first point cloud and the second point cloud,
      obtaining a sample space of rigid body transforms, wherein a previous point cloud registration identified each rigid body transform of the sample space of rigid body transforms,
      identifying a proposal distribution, wherein the proposal distribution comprises probabilities that each rigid body transform in the sample space is the rigid body transform that best aligns the subset of points of the first point cloud to the subset of points in the second point cloud,
      performing importance sampling on the proposal distribution identify a probability distribution for the rigid body transform that best aligns the subset of points of the first point cloud to the subset of points in the second point cloud, and
      using the identified probability distribution and a history of previously-identified probability distributions to estimate a kinetic state of the rigid body, wherein using the history of probability distributions to estimate the kinetic state of the rigid body comprises using the history of probability distributions as a measurement of object pose in a Kalman Filter to estimate position, velocity, and acceleration of the rigid body over time.

2. The method of claim 1, further comprising:
   identifying a sample size for the sample space;
   calculating an effective sample size between the proposal distribution and the probability distribution;
   comparing the effective sample size to the identified sample size to determine if the proposal distribution is similar to the probability distribution; and
   upon determining that the proposal distribution is not similar to the probability distribution:
      obtaining an updated sample space using an increased sample size,
      identifying an updated proposal distribution for the updated sample space, performing importance sampling on the updated proposal distribution to identify an updated probability distribution, and
      using the updated probability distribution and the history of previously-identified probability distributions to re-estimate the kinetic state of the rigid body.

3. The method of claim 1, wherein identifying the proposal distribution comprises using a uniform distribution.

4. The method of claim 1, wherein identifying the proposal distribution comprises using a prior probability distribution.

5. The method of claim 1, wherein performing importance sampling on the proposal distribution to identify the probability distribution comprises:
modeling the probability distribution as a Gaussian distribution parameterized by a mean and covariance; and
using importance sampling on the proposal distribution to approximate the mean and covariance of the probability distribution.

6. The method of claim 1, wherein identifying the proposal distribution comprises:
determining a kernel function that reflects an affinity between a point of the rigid body in the subset of points in the second point cloud and a point of the rigid body in the subset of points in the first point cloud via the rigid body transform; and
using the kernel function to determine potentially optimal rigid body transforms.

7. The method of claim 6, wherein the affinity comprises one or more of the following: point density, point color, point surface intensity, or point surface normal.

8. The method of claim 1, wherein obtaining the sample space of rigid body transforms comprises using a lookup table for all combinations of a prior point cloud and corresponding rigid body transforms.

9. The method of claim 1, further comprising separately specifying a naturally encoded uncertainty of the probability distribution that corresponds to the optimal rigid body transform.

10. A system for estimating a kinetic state of a rigid body, the system comprising:
a LiDAR sensor configured to receive a first point cloud and a second point cloud, wherein:
the first point cloud and second point cloud each comprise a subset of points, and
each point in each subset of points comprises data returned to the LiDAR sensor from a rigid body;
a memory device; and
a processor and programming instructions that are configured to cause the processor to:
determine a rigid body transform for the first point cloud and the second point cloud,
obtain a sample space of rigid body transforms, wherein a previous point cloud registration identified each rigid body transform of the sample space of rigid body transforms,
identify a proposal distribution, wherein the proposal distribution comprises probabilities that each rigid body transform in the sample space is the rigid body transform that best aligns the subset of points of the first point cloud to the subset of points in the second point cloud,
perform importance sampling on the proposal distribution identify a probability distribution for the rigid body transform that best aligns the subset of points of the first point cloud to the subset of points in the second point cloud, and
use the identified probability distribution and a history of previously-identified probability distributions to estimate a kinetic state of the rigid body, wherein the programming instructions to use the history of probability distributions to estimate the kinetic state of the rigid body comprise instructions to use a history of probability distributions as a measurement of object pose in a Kalman Filter to estimate position, velocity, and acceleration over time.

11. The system of claim 10, wherein the programming instructions to obtain the sample space of rigid body transforms comprise instructions configured to cause the processor to:
identify a sample size for the sample space;
calculate an effective sample size between the proposal distribution and the probability distribution;
compare the effective sample size to the identified sample size to determine if the proposal distribution is similar to the probability distribution; and
upon determining that the proposal distribution is not similar to the probability distribution:
obtain an updated sample space using an increased sample size,
identify an updated proposal distribution for the updated sample space, performing importance sampling on the updated proposal distribution to identify an updated probability distribution, and
use the updated probability distribution and the history of previously-identified probability distributions to re-estimate the kinetic state of the rigid body.

12. The system of claim 10, wherein the programming instructions to identify the proposal distribution comprise instructions to use a uniform distribution.

13. The system of claim 10, wherein the programming instructions to identify the proposal distribution comprise instructions to use a prior probability distribution.

14. The system of claim 10, wherein the programming instructions to perform importance sampling on the proposal distribution to identify the probability distribution comprise instructions to:
model the probability distribution as a Gaussian distribution parameterized by a mean and covariance; and
use importance sampling on the proposal distribution to approximate the mean and covariance of the probability distribution.

15. The system of claim 10, wherein the programming instructions to identify the proposal distribution comprise instructions to:
determine a kernel function that reflects the affinity between a point of the rigid body in the subset of points in the second point cloud and a point of the rigid body in the subset of points in the first point cloud via the rigid body transform; and
use the kernel function to determine potentially optimal rigid body transforms.

16. The system of claim 15, wherein the affinity comprises one or more of the following: point density, point color, point surface intensity, or point surface normal.

17. The system of claim 10, wherein the programming instructions to obtain the sample space of rigid body transforms comprise instructions to use a lookup table, stored within the memory device, for all combinations of a prior point cloud and corresponding rigid body transforms.

18. The system of claim 10, further comprising additional programming instructions configured to cause the processor to separately identify a naturally encoded uncertainty of the probability distribution that corresponds to the optimal rigid body transform.

* * * * *